United States Patent [19]
Fellinger et al.

[11] 4,322,844
[45] Mar. 30, 1982

[54] TRANSMITTER-RECEIVER SYNCHRONIZER

[75] Inventors: Frank Fellinger, Delaware; Michael C. Willett, Clinton, both of Ohio; Haresh C. Jotwani, Longwood, Fla.

[73] Assignee: International Telephone and Telegraph Corporation, New York, N.Y.

[21] Appl. No.: 215,048

[22] Filed: Dec. 10, 1980

Related U.S. Application Data

[63] Continuation of Ser. No. 77,346, Sep. 20, 1979, abandoned.

[51] Int. Cl.³ .............................................. H04J 3/00
[52] U.S. Cl. ........................................ 370/84; 364/900
[58] Field of Search ............... 340/146.3 H, 347 DD; 370/102, 84; 364/200, 900; 179/1.5 H, 15.55 R, 15.55 T; 375/107, 112

[56] References Cited

U.S. PATENT DOCUMENTS

| | | | |
|---|---|---|---|
| 3,390,379 | 8/1968 | Carlson et al. | 364/200 |
| 3,503,045 | 3/1970 | Wright | 364/200 |
| 3,516,074 | 2/1970 | Enomoto et al. | 364/200 |
| 3,908,087 | 9/1975 | Krol | 370/84 |
| 4,138,596 | 2/1979 | Roche | 370/84 |
| 4,173,014 | 10/1979 | Leighou et al. | 179/15.55 T |

*Primary Examiner*—Mark E. Nusbaum
*Assistant Examiner*—E. S. Kemeny
*Attorney, Agent, or Firm*—James B. Raden; Donald J. Lenkszus

[57] ABSTRACT

A transmitter-receiver synchronizer is described for use in terminating T1 lines from a subscriber line switch at a central time division multiplexed switching system. A shared rate converter provides bidirectional data rate conversion between the 1.544 Mb/s T1 line and the 2.048 Mb/s switching system. Two buffer memories are used, each writing in at one rate, and reading out at another rate.

12 Claims, 6 Drawing Figures

FIG. 2

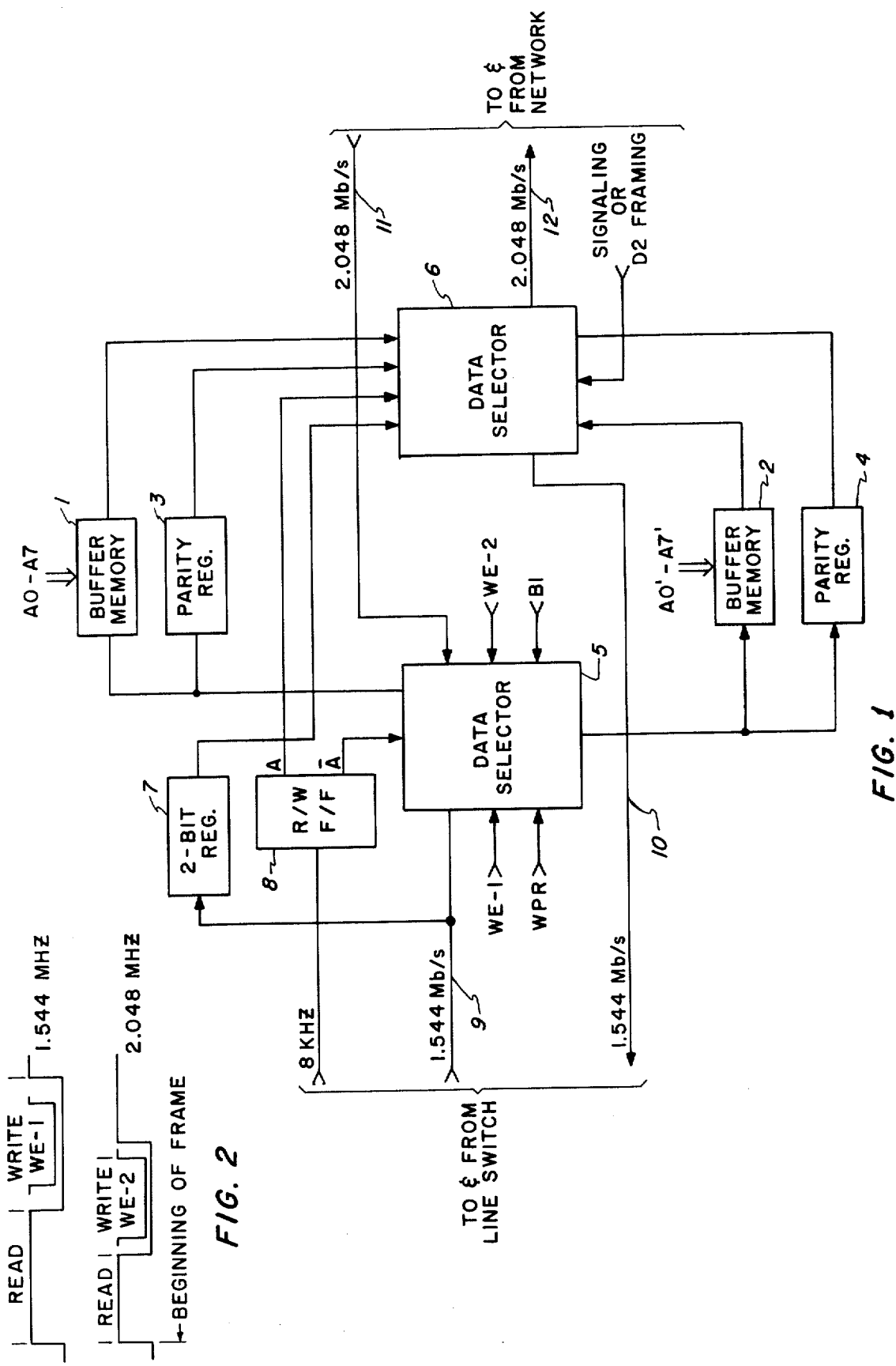

TRANSMITTER-RECEIVER SYNCHRONIZER

This is a continuation of application Ser. No. 077,346 filed Sept. 20, 1979, now abandoned.

BACKGROUND OF THE INVENTION

This invention pertains to telephone switching systems, in general, and to apparatus for interfacing digital transmission lines and digital telephone switching systems in particular.

Where a digital transmission line is used to interface a digital switching network of a Central Office with remote equipment such as a remote line switch, a channel bank or another digital office, it is known to provide a carrier terminal unit or span interface to provide terminating functions for the transmission line such as described in copending application Ser. No. 937,456 filed Aug. 28, 1978 by F. Fellinger et al and assigned to the same assignee as the present application. As pointed out in the above-referenced application, the primary digital carrier, DS1, employed in North America, utilizes 24 pcm channels at a 1.544 Mb/s bit rate with D2/D3 signalling format. In a recently developed family of time-division multiplexed switching systems developed by ITT North Electric Company previously identified as "DSS" and now referred to as System 1210, it was found to be particularly advantageous to switch voice paths at a 2.048 Mb/s bit rate. Various aspects of the "DSS" or now "System 1210" family of systems have been described by N. J. Skaperda in "Generic Digital Switching Systems", International Switching Symposium, Vol. 1, October 1976; by C. G. Svala in "DSS-1, A Digital Local Switching System with Remote Line Switches", Proceedings of the National Telecommunications Conference, p 3915-1, 1977; and by F. Fellinger in "Modular Digital Switching Network", International Communications Conference, June 4–7, 1978.

The carrier terminal unit described in the above-referenced application is particularly suited for interfacing between a remote line switch and a central office. Where a local line switch is employed, the complex synchronization equipment needed for the operation of the remote line switch is not required. More specifically, because of the proximity of the local line switch to the digital network, the network clock can be distributed directly to the line switch to provide timing, i.e., it is not necessary to derive clock signals from the incoming pcm data stream. Additionally, framing circuits, the elastic store arrangement, unipolar/bipolar and bipolar/unipolar conversions of the data, as provided in the carrier terminal unit, are not required. However, it is necessary to provide an interface between the local line switch and the network which provides rate conversion, bit alignment and signalling format conversion functions.

SUMMARY OF THE INVENTION

In accordance with the principles of the invention, a transmitter-receiver synchronization unit is provided for terminating T1 lines from a subscriber line switch at a central time division multiplexed switching system. Further in accordance with the invention, bit alignment and signalling format conversions are provided.

A transmitter-receiver synchronization unit, in accordance with the invention, utilizes a two memory or shared buffer rate converter for converting from a first data rate to a second data rate and for converting from the second data rate to the first data rate.

In accordance with the principles of the invention, data is stored one frame at a time in a memory and, one frame later, is read from the memory at the second rate. During a first frame interval, one frame of data at a first rate is stored in a first memory while one frame of data at the second rate is stored in a second memory. During a second frame interval, the first memory is read at the second data rate and the second memory is read at the first data rate. Also during the second frame interval, one frame of data at the first rate is stored in the second memory and one frame of data at the second rate is stored in the first memory. During a third frame interval, the first memory is read at the first data rate, the second memory is read at the second data rate, one frame of data at the first rate is stored in the first memory, and one frame of data at the second data rate is stored in the second memory. The process is repeated for subsequent frames.

BRIEF DESCRIPTION OF THE DRAWINGS

The invention may be better understood from a reading of the following detailed description in conjunction with the drawings in which:

FIG. 1 illustrates in block diagram form a transmitter-receiver synchronizer in accordance with the principles of the invention;

FIG. 2 is a timing diagram of the read and write operations of the buffer memories of FIG. 1;

DETAILED DESCRIPTION OF THE DRAWINGS

Figure 3:
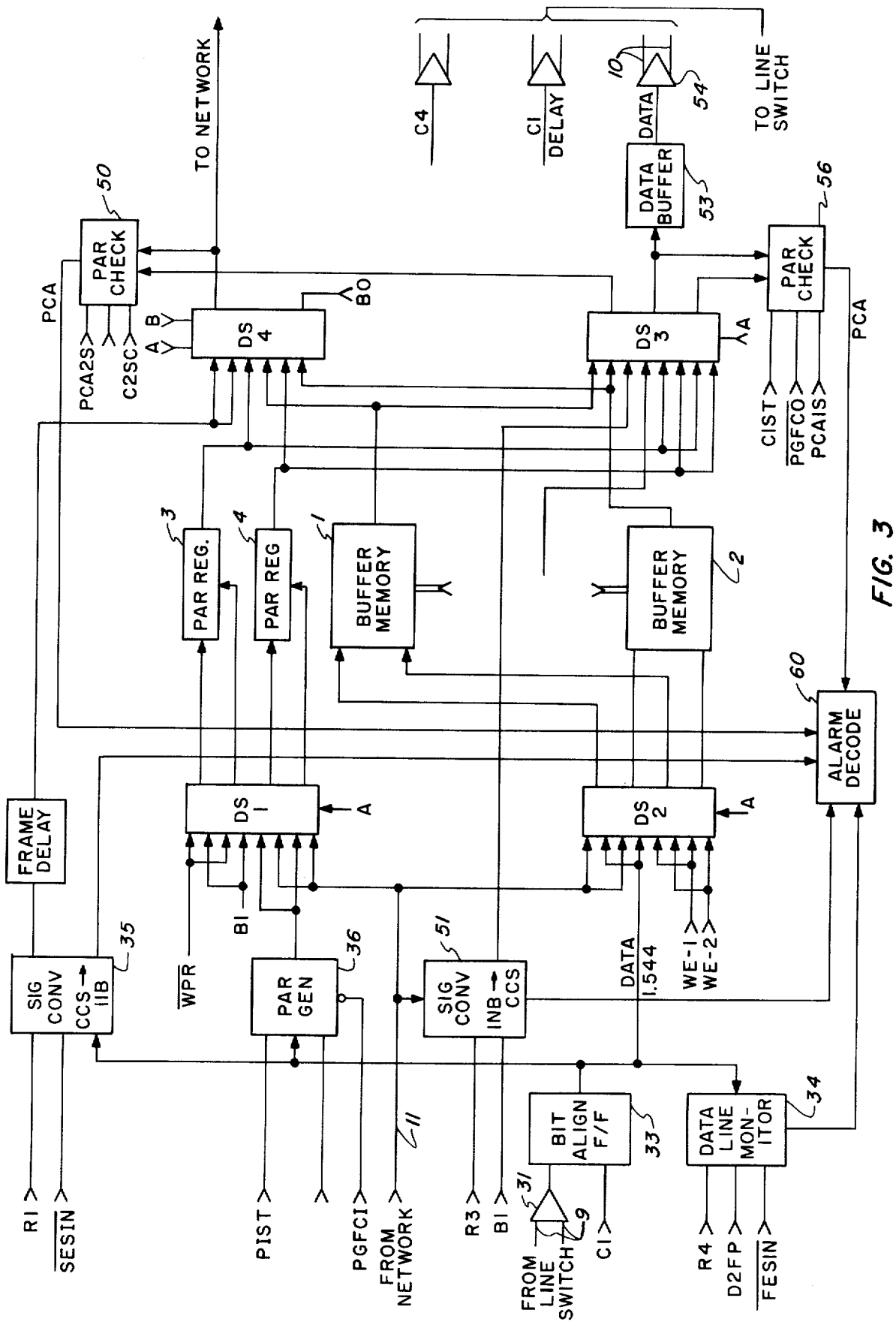
FIG. 3 is a more detailed block and schematic diagram of a transmitter-receiver synchronizer.

In one embodiment of the invention, data is transmitted to and received from a line switch at a 1.544 Mb/s rate as 192 bits of data arranged as 8 bits in each of 24 channels plus an additional bit for signalling or framing or a total of 193 bits every 125 microseconds. Data is transmitted and received from the network at a 2.048 Mb/s rate as 240 bits of data arranged as 10 bits (8 bits+parity+signalling) in each of 24 channels and 16 "unassigned" bits or a total of 256 bits every 125 microseconds.

The transmitter-receiver synchronizer described herein converts data coming from the line switch to the higher rate before transmitting the data to the network. Data from the network is converted to the lower rate before it is transmitted to the line switch.

FIG. 1 is a simplified block diagram of the transmitter-receiver synchronizer. Two buffer memories 1 and 2 are provided for storing data. Each buffer memory is a random access memory which in the illustrative embodiment is a 256 word by 1 bit commercially available device.

Data is stored in a buffer memory one frame at a time and, one frame later, is read out at the different rate. Associated with the operation of the buffer memories 1 and 2 are two parity registers 3 and 4 each comprising a 24 bit shift register, two data selectors 5 and 6, a two-bit storage register 7 and a Read/Write (R/W) flip-flop 8.

The transmitter-receiver synchronizer is connected to the line switch via lines 9 and 10. Data is transmitted from the line switch over line 9 and is received by the line switch over line 10. Connections to the network are provided via lines 11 and 12. Data is transmitted from the network over line 11 and data is received by the network over line 12.

If it is assumed that the R/W flip-flop 8 is set such that its output A' is active, addresses supplied to buffer memory 1 over leads A0–A7 are incremented at a 1.544 MHz rate and addresses supplied to buffer memory 2 over leads A0'–A7' are incremented at a 2.048 MHz rate. The memory addresses are supplied from a set of eight bit counters clocked at the respective frequencies.

With A' active, data selector 5 connects the transmit line 9 from the line switch to the data input of buffer memory 1 and the transmit line 11 from the network to the data input of buffer memory 2. Data selector 6 connects the receive line 10 of the line switch to the data output of buffer memory 1 and connects the receive line 12 of the network to the data output of buffer memory 2.

As shown in the timing diagrams of FIG. 2 during the first half of the 1.544 MHz cycle, data from the network stored during the previous frame is read from buffer memory 1 and transmitted to the line switch; during the second half of the cycle, data received from the line switch is stored in buffer memory 1. During the same frame, data is transferred from buffer memory 2 to and from the network. During the first half of the 2.048 MHz cycle, data from the line switch stored during the previous frame is read from buffer memory 2 and transmitted to the network; during the second half of the cycle, data received from the network is stored in buffer memory 2.

At the end of a frame, the R/W flip-flop 8 changes state. As a result, output A becomes active and A' becomes inactive. Now, the addresses supplied to buffer memory 1 over leads A0–A7 are incremented at a 2.048 MHz rate while addresses supplied to buffer memory 2 over leads A0'–A7' are incremented at a 1.544 MHz rate. Data selector 5 connects the transmit line 11 from the network to the data input of buffer memory 1 and the transmit line 9 from the line switch to buffer memory 2. Data selector 6 connects the receive line 12 of the network to the data output of buffer memory 1 and the receive line 10 of the line switch to the data output of buffer memory 2. Buffer memory 1 is now read at a 2.048 MHz rate to supply the previous frame data from the line switch to the network and data received from the network is written into buffer memory 1. Similarly, buffer memory 2 is now read at a 1.544 MHz rate to supply the previous frame data from the network to the line switch and data received from the line switch is written into buffer memory 2.

There are two bits of each frame that are not stored in the buffer memories 1 and 2. The frame of data transmitted from the line switch is delayed 2½ to 3½ bit times from the frame supplied on the receive line of the line switch. This delay represents a 2½ bit delay in the line switch itself as well as a variable delay, up to one bit time, due to cable length variations. Because of this delay, the last two bits in a frame from the line switch will not have arrived at the time the R/W flip-flop 8 changes state. In fact, by the time these last bits do arrive at the transmitter-receiver synchronizer, the buffer memory that they would have been written into is already being read and receiving data from the network at the 2.048 Mb/s rate. Accordingly, these two bits are loaded into the storage register 7 from which they are subsequently multipled into the data stream to the network by the data selector 6.

The delay problem does not exist for data coming from the network becuase the last data bit of a frame is written six time slots before the end of the frame.

FIG. 3 illustrates the transmitter-receiver synchronizer of FIG. 1 in greater detail. The data selector 5 of FIG. 1 is replaced by its component blocks DS1 and DS2. Likewise, the data selector 6 is replaced by its component blocks DS3 and DS4. At the input from the line switch, a differential receiver 31 receives data over the digital lines 9 and feeds the data into the bit alignment flip-flop 33. Bit alignment flip-flop 33 reclocks the data to equalize variations in loop delay. This is done so that a fixed rather than variable delay appears at the input to the buffer memories.

The data at the output of the bit alignment flip-flop 33 is checked by a data line monitor circuit 34. The D2 framing pattern inserted into the data in the 193rd bit time every alternate frame is compared as it comes from the line switch against a pattern which was inserted from pattern generator 413 of the timing and control circuits. If a mismatch occurs, an error signal is generated.

The bit aligned data from bit alignment flip-flop 33 is fed to data selector DS2, a signalling conversion flip-flop 35, and parity generation flip-flop 36. Data selector DS2 directs data to either buffer memory 1 or buffer memory 2 depending on the state of the R/W flip-flop 8 shown in FIG. 4. The signalling conversion flip-flop 37 extracts the signalling bit from the data and stores it for later insertion into the 2.048 Mb/s data stream to the network.

Odd parity is generated over the input data from the line switch with parity generator flip-flop 36 and is strobed into either parity register 3 or parity register 4 via data selector DS1 as determined by signal WPR' which is provided by the delay, decode and gating logic 401. Parity generator flip-flop 36 toggles for each bit that is a logic "1", such that at the end of eight bits, the output is a logic "1" if the number of bits was even and a logic "0" if the number of bits was odd. At the end of the eighth bit, the flip-flop is reset by the signal PGFCI. This reset signal is generated by the logic 401. This odd parity is generated over each 8-bit channel received from the line switch.

At the output of the buffer memories 1 and 2, the data selector DS4 selects data at 2.048 Mb/s and gates it to the network, selecting the parity bit (9th bit of every channel) from the parity register and the signalling bit (10th bit of every channel) from the signalling conversion flip-flop 35 thereby converting common channel signalling to inband signalling.

The data selector DS4 is an 8 to 1 data selector. A three bit selection address is provided to data selector DS4 over leads B0', B1 and A from the bit address counter 402 and R/W flip-flop 8 of FIG. 4. At the output of data selector DS4, odd parity is checked by parity checker 50 to insure error free operation of the buffer memories 1, 2 and the parity registers 3, 4. Parity is checked by comparing a regenerated parity bit with the parity bit obtained from the parity registers. The parity check circuit 50 regenerates parity over every channel by means of a flip-flop which is not shown. The parity check logic is strobed by a signal PCA25 during the eight bit of a channel and a parity check alarm PCA is generated if wrong parity is obtained. The parity check circuit 50 is cleared by the PCFCR signal during the tenth bit of every channel.

On the outgoing side of the transmitter-receiver synchronizer, the previously described process is reversed. 2.048 Mb/s data from the network is converted back to 1.544 Mb/s data and transmitted out to the line switch. The data, as it comes from the network, goes to signalling conversion flip-flop 51 and to data selectors DS1 and DS2.

The signaling conversion flip-flop extracts the inband signalling bit which is the tenth bit of every channel and stores it for insertion into evey alternate 193rd bit position at the output to the line switch. Data selector DS1 provides the data from the network to either parity register 3 or 4 and data selector DS2 provides the data to either buffer memory 1 or 2 depending on the state of R/W flip-flop 8. Thus, data from the network is present at the inputs of a selected parity register and of a selected buffer memory. At the selected parity register, clock signal B1 is used to clock the ninth bit of every channel, which is the parity bit, into the selected register. Likewise, at the input to the selected buffer memory, write-enable signal WE-2 is used to strobe the eight bits of data per channel into the selected buffer memory. The ninth and tenth bits per channel, i.e., parity and signalling are not stored in the selected buffer memory.

At the output of the buffer memories, the stored data is converted to a 1.544 Mb/s data stream. Data selector DS-3 selects data from one of the buffer memories and sends it to the line switch via data buffer flip-flop 53 and bus driver 54 over line 55. In a manner similar to that described hereinabove relative to data selector DS-4, data selector DS-3 selects parity from the appropriate one of parity registers 3 or 4, for comparison against parity regenerated from data read from the associated buffer memory. Parity regeneration and checking is provided by parity check circuit 56. In addition, data selector DS-3 inserts the 193rd bit signalling information from signalling conversion flip-flop 51 into every alternate frame and the D2 framing pattern obtained over lead D2FP into the intermediate frames.

The data that is read from the buffer memories 1 and 2 at 1.544 Mb/s is available only during the read half of a cycle. The duration of a data bit required at the line switch is equal to the full cycle. Accordingly, the data buffer flip-flop 53 is employed at the output of data selector DS-3 to provide the required stable bit duration.

Figure 4:
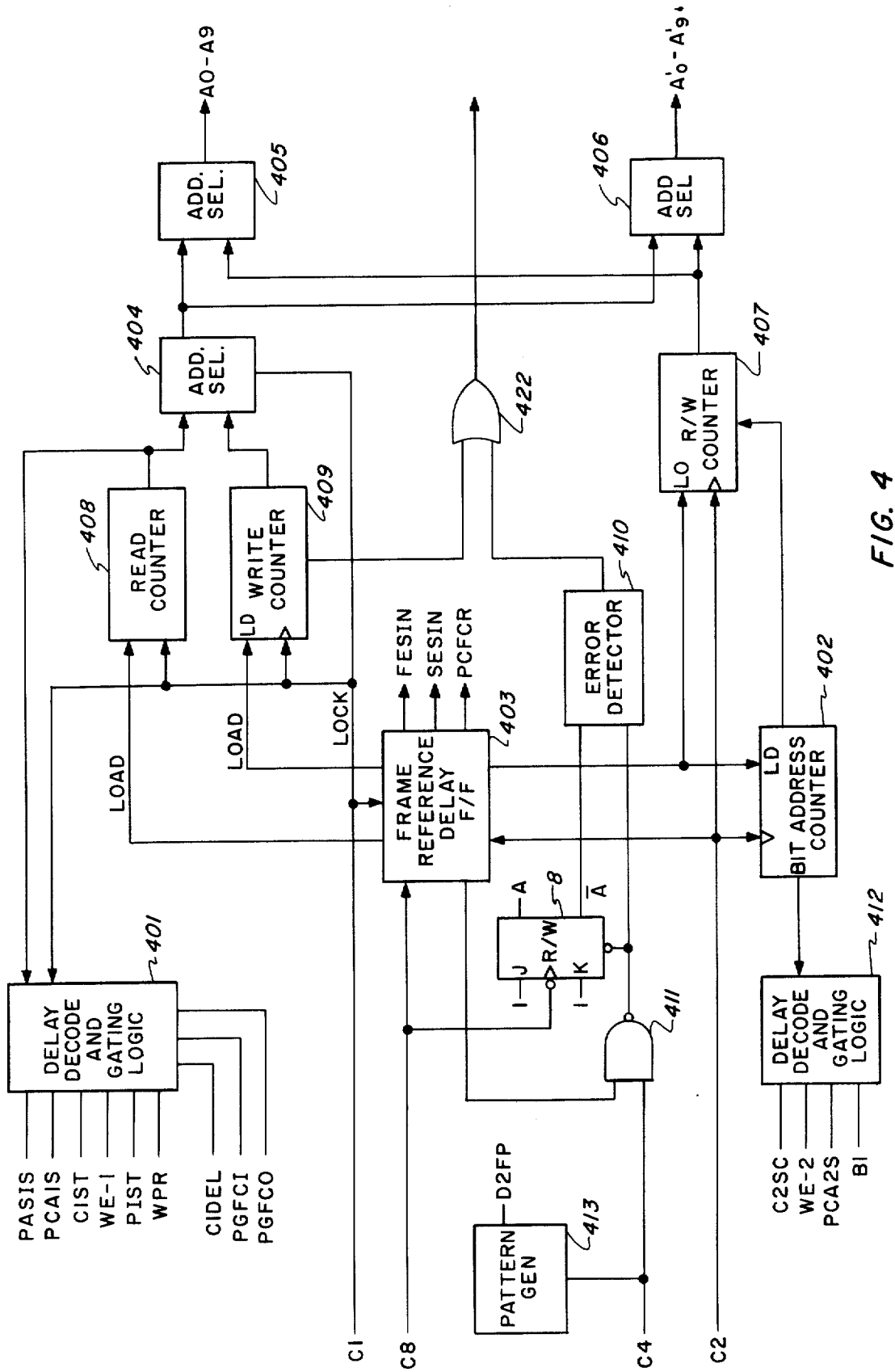
FIG. 4 is a schematic diagram of timing and control circuits for the arrangement of FIG. 3.
Figure 5:
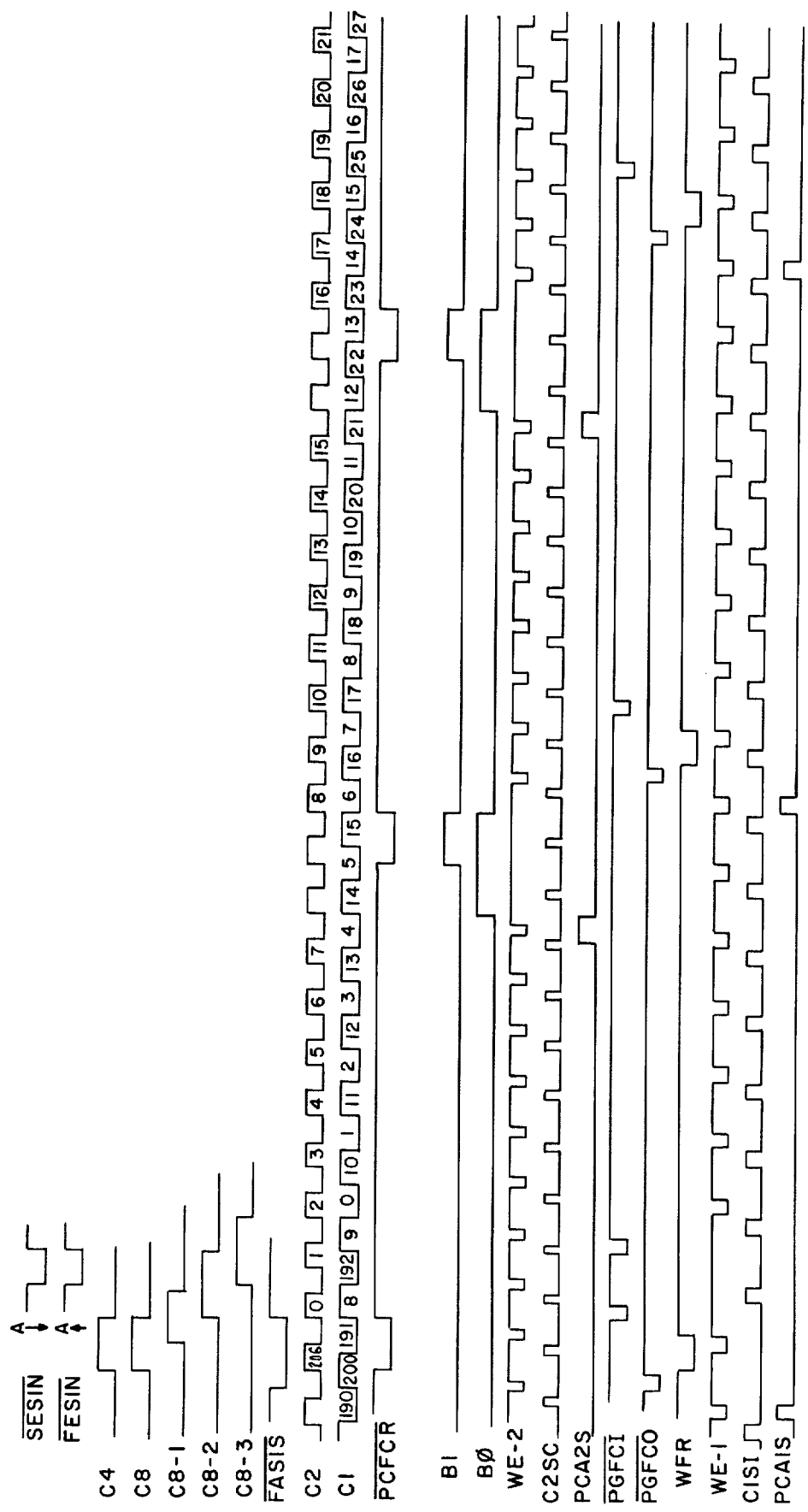
FIG. 5 is a timing diagram of various signals.

The timing and control circuits for the transmitter-receiver synchronizer are shown in FIG. 4. In addition, FIG. 5 illustrates the timing waveforms for signals provided by the timing and control circuits. A list of the signals and definitions is provided in the table presented below.

TABLE OF SIGNALS

| Name | Definition |
|---|---|
| SESIN | Signaling bit extraction signal(incoming) |
| FESIN | Framing bit extraction signal(incoming) |
| C4 | 4 KHz clock |
| C8 | 8 KHz clock |
| C8-1 | 8 KHz clock delayed 244 nsec |
| C8-2 | 8 KHz clock delayed 488 nsec |
| C8-3 | 8 KHz clock delay 488 + 324 = 812 nsec |
| FASIS | Framing and signaling bit insertion signal |
| C2 | 2.048 MHz clock |
| C1 | 1.544 MHz clock |
| PCFCR | Parity check flip-flop clear(2.048 Mb/sec data) |
| B1 | Clock to 2.048 MHz parity register |
| B0 | LSB on address to DS-4 |
| WE-2 | Write enable to the RAMs(2.048 MHz) |
| PCA2S | Strobe for parity check error(2.048 MHz) |
| C2SC | Strobe for 2.048 Mb/sec data into the parity check flip-flop |
| PGFCI | Parity generation flip-flop clear signal |
| PGFCO | Parity check flip-flop clear(1.544 MHz) |
| WPR | Clock to 1.544 MHz parity register |
| WE-1 | Write enable to RAMs(1.544 MHz) |
| CIST | Strobe for 1.544 Mb/sec data into the parity check flip-flop |
| PCA1S | Strobe for parity check error(1.544 MHz) |
| PIST | Strobe for 1.544 Mb/sec data into parity generation flip-flop |
| C1DEL | Delayed C1 |
| D2FP | D2 framing pattern |
| PCA | Parity check alarm |

The main circuits provided in the timing and control circuits are two 1.544 MHz counters 408 and 409, a 2.048 MHz counter 407, a frame reference delay circuit 403, a bit-address counter 402, address selectors 404, 405, 406, the R/W flip-flop 8 and delay, decode and gating circuits 401 and 412. The gates 411 and 422 and error detector 410 are provided for hardware error detection.

The 1.544 MHz counters 408 and 409 respectively provide the read and write addresses to the buffer memories 1 and 2. The counters 408 and 409 differ by one channel count and are reset at different instants of time. Network data to the transmitter-receiver synchronizer is delayed by one channel and data is therefore written into addresses 8 to 200 of a selected buffer memory. Consequently, the read counter 408 must be reset at the beginning of each frame to address 8 in order to properly read the data in the subsequent frame. Because of transmission delays to the line switch and back, the write counter 409 must be initialized to address zero one bit time after the beginning of each frame.

The 2.048 MHz counter 407 generates the 'Read Addresses' for reading data at 2.048 Mb/s from the buffer memories to the network and the 'Write Addresses' for writing data at 2.048 Mb/s from the network to the buffer memories. Counter 407 is clocked with the 2.048 MHz clock, but during every ninth and tenth clock pulses, the counter 407 is disabled and the count is maintained. This is necessary because during reading a buffer memory at 2.048 MHz, parity is added during the ninth bit and signalling during the tenth bit of every channel, and during memory writes at 2.048 MHz the ninth bit parity and the tenth bit signalling per channel are not written into the buffer memory. The counter 407 is reset to zero with a signal from the 'Frame Ref' Delay flip-flops 403.

The bit address counter 402 is a decade counter that provides several timing pulses which repeat every ten clock pulses of the 2.048 MHz clock. The following signals are decoded from this counter:

(a) The ninth and tenth clock pulse inhibit for the 2.048 MHz counter 407.
(b) The B1 signal for writing and reading parity bits for the 2.048 MHz data in and out of the parity registers 3 and 4.
(c) The ninth bit parity insertion signal for DS-4.
(d) The tenth bit signalling insertion signal for DS-4.

The two address selectors 405 and 406 alternately switch back and forth between MHz counter 407 and the counters 408 and 409, i.e., during a frame, address selector 405 selects the counter 407 and address selector 406 selects counters 408, 409. In the next frame, address selector 405 selects counter 408, 409 and address selector 406 selects the counter 407. The two address selectors 405, 406 are switched between the counters by the A and A̅ signals from the R/W flip-flop 8.

Address selector 404 alternately selects the addresses from the counters 408, 409. The 1.544 MHz clock is used as the select control for the address selector 404.

The R/W flip-flop 8 provides an important control function. The flip-flop 8 is toggled at the beginning of every frame by C8 (the 8 KHz frame clock), and it is reset every other frame by C4 (the 4 KHz signalling clock). Thus, the outputs of the flip-flop are referenced to C4 in order to distinguish between framing and signalling bits. The A output controls the addresses to buffer memory 1 ($A_0$-$A_7$) by switching address selector 405 from the counters 408, 409 to the counter 406. The A̅ output controls the addresses to buffer memory 2 ($A_0'$-$A_7'$) through address selector 406 in the same manner and also provides control for all the data selectors DS1, DS2, DS3, and DS4.

Two delay lines which are included in the circuits 401 and 402 are needed to give delayed clocks for generating various timed pulses, WE-1 and WE-2 signal, etc. These delay lines will require several taps on them to provide various fixed delay points. In addition to the circuits described, there are several flip-flops and gates on this card which provide timing functions.

The preceding description has only briefly mentioned signalling conversion. It is required to convert D2 or Common Channel signalling (CCS) to inband signalling for the incoming data and inband signalling to D2/CCS for the outgoing data. Involved with this conversion is the correct insertion of the signalling bit so that the signalling information can be correctly identified.

Figure 6:
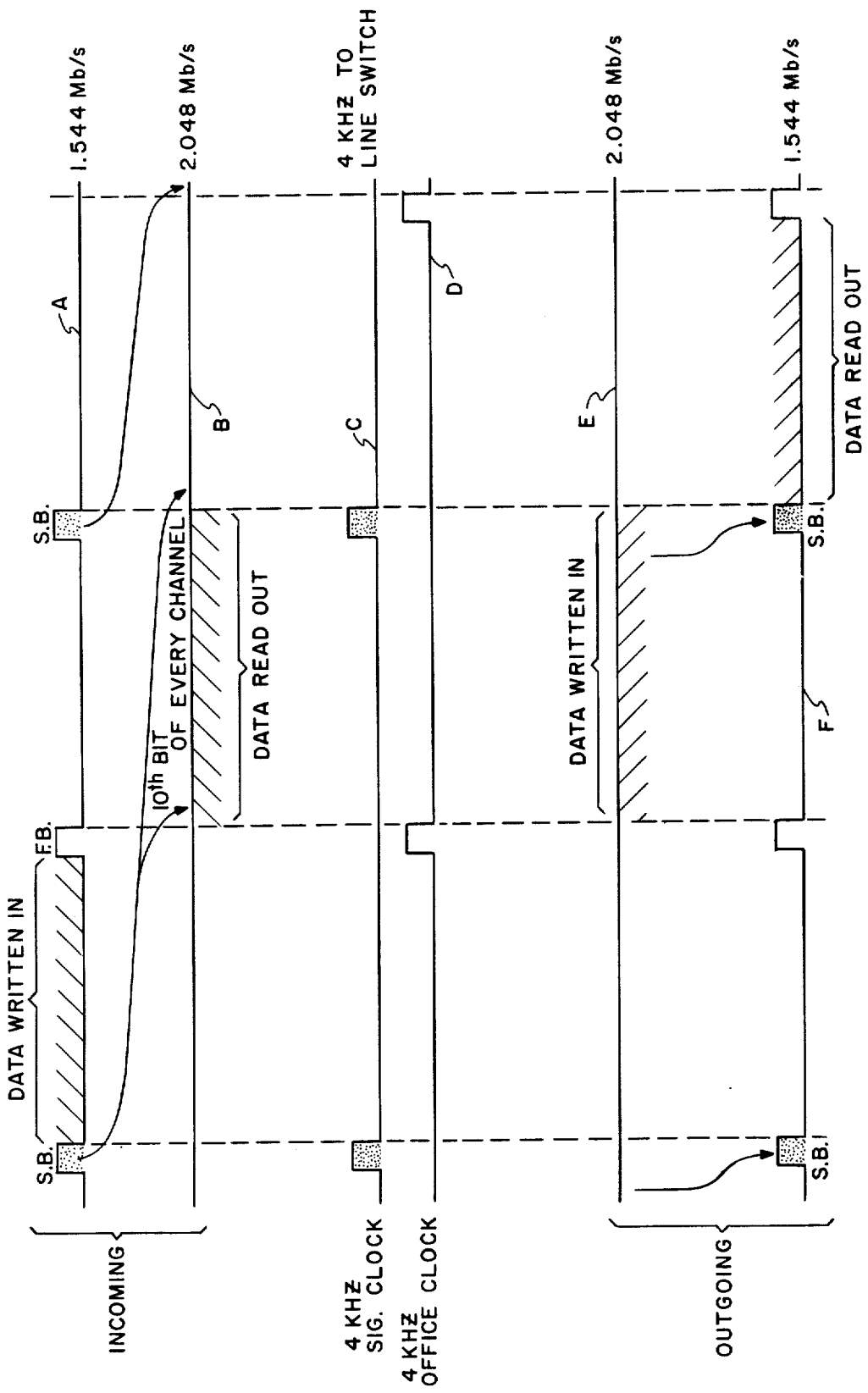
FIG. 6 is a timing diagram illustrating signalling conversion.

FIG. 6 gives a brief outline of this signalling conversion. On the incoming side, 1.544 Mb/s data coming from the digital line is written into a storage buffer and the signalling bit is extracted as shown in waveform A. One frame later, when the data is being read out of the buffer, this signalling bit is inserted into the tenth bit position of every channel for two frames (i.e., until the next signalling bit is extracted) as shown in waveform B.

On the outgoing side, 2.048 Mb/s data coming from the network is written into another storage buffer and the signalling bit is extracted from the tenth bit of the last channel in the frame as shown in waveform E. This signalling bit is inserted into the 193rd bit position of the outgoing data as shown in waveform F. A special 4 KHz signal as shown in waveform C is generated during this bit period and shipped out to the line switch so that this signalling bit can be identified. Waveform D illustrates the waveform of the 4 KHz office clock.

Although the above description indicates that the transmitter-receiver synchronizer is connected to the network, it should be noted that the connection may be via multiplexing-demultiplexing circuits.

It will be obvious to those skilled in the art that various modifications and changes may be made without departing from the spirit and the scope of the invention.

What is claimed is:

1. Apparatus for providing bidirectional rate conversion between frames of data having a first rate and a first format and frames of data having a second rate and a second format; said apparatus comprising:

first and second buffer memory means;
 means for storing a first frame of data at said first rate in said first memory means during a first frame interval;
 means for storing a second frame of data at said second rate in said second memory means during said first frame interval;
 means for reading said stored first frame of data stored in said first memory means at said second rate during a second frame interval;
 means for reading said stored second frame of data stored in said second memory means at said first rate during said second frame interval;
 means for storing a third frame of data at said second rate in said first memory means during said second frame interval; and
 means for storing a fourth frame of data at said first rate in said second memory means during said second frame interval.

2. Apparatus for converting incoming first frames of data having a first rate and a first format to outgoing second frames of data having a second rate and a second format and for converting incoming second frames of data having said second rate and said second format to outgoing first frames of data having said first rate and said first format, said apparatus comprising:
 first and second buffer memory means;
 means for storing a first incoming first frame of data at said first rate in said first memory means during a first frame interval;
 means for storing a first incoming second frame of data at said second rate in said second memory means during said first frame interval;
 means for reading said stored first incoming first frame of data stored in said first memory means at said second rate during a second frame interval to obtain one of said outgoing second frames;
 means for reading said stored first incoming second frame of data stored in said second memory means at said first rate during said second frame interval to obtain one of said outgoing first frames;
 means for storing a second incoming second frame of data at said second rate in said first memory means during said second interval; and
 means for storing a second incoming first frame of data at said first rate in said second memory means during said second interval.

3. Apparatus in accordance with claim 2, wherein said incoming and outgoing first frames are each arranged as a plurality of first channels and predetermined ones of said incoming and outgoing first frames include a signaling bit, and each of said incoming and outgoing second frames is arranged as a plurality of second channels, predetermined ones of said second channels including a second signaling bit.

4. Apparatus in accordance with claim 3, wherein said first incoming first frame is one of said predetermined ones of said incoming frames, and said apparatus comprises:
 means for storing said first signaling bit of said first incoming first frame during said first interval;
 means for reading said stored first signaling bit during said second interval;

means for inserting said read first signaling bit in said one of said outgoing second frames as said second signaling bit.

5. Apparatus in accordance with claim 4, wherein said inserting means inserts said read first signaling bit in a second one of said outgoing second frames as said second signaling bit.

6. Apparatus in accordance with claim 3, 4 or 5 comprising:
   means for storing a predetermined one of said second channel second signaling bits of said first incoming second frame; and
   means for inserting said stored second signaling bit as said first signaling bit in one of said predetermined ones of said outgoing first frames.

7. Apparatus in accordance with claim 3, 4 or 5, comprising means for calculating a plurality of error detection bits for said first incoming first frame, each of said plurality of error detection bits being calculated for one of said plurality of first channels;
   means for storing said plurality of error detection bits;
   means for inserting said plurality of error detection bits in said second channels of said one of said outgoing second frames.

8. Apparatus in accordance with claim 6, comprising means for calculating a plurality of error detection bits for said first incoming first frame, each of said plurality of error detection bits being calculated for one of said plurality of first channels;
   means for storing said plurality of error detection bits;
   means for inserting said plurality of error detection bits in said second channels of said one of said outgoing second frames.

9. A rate converter for converting incoming first frames of PCM data received at a first rate at a first terminal to outgoing second frames of PCM data at a second rate at a second terminal and for converting incoming second frames of PCM data received at said second rate at a third terminal to outgoing first frames of PCM data at said first rate at a fourth terminal comprising:
   a first memory means for storing PCM data;
   a second memory means for storing PCM data;
   a first selector means for connecting said first terminal to said first memory means and said third terminal to said second memory means during alternate frame intervals such that said incoming first frames are stored at said first rate in said first memory means and said incoming second frames are stored at said second rate in said second memory means during said alternate frame intervals;
   said first selector means further connecting said first terminal to said second memory means and said third terminal to said first memory means during intermediate frame intervals such that said incoming first frames are stored at said first rate in said second memory means and said incoming second frames are stored at said second rate in said first memory means during intermediate frame intervals;
   a second selector means for connecting said second terminal to said first memory means and said fourth terminal to said second memory means during said alternate frame intervals such that an incoming second frame previously stored in said first memory means is read at said first rate and an incoming first frame previously stored in said second memory means at said first rate is read at said second rate, said second selector means further connecting said second terminal to said second memory means and said fourth terminal to said first memory means during said intermediate frame intervals such that an incoming second frame previously stored in said second memory means is read at said first rate and an incoming first frame previously stored in said first memory means is read at said second rate.

10. A rate converter in accordance with claim 9, wherein predetermined ones of said incoming first frames each include a first signaling bit and each of said outgoing second frames include a plurality of PCM second channels, predetermined ones of said PCM second channels having a second signaling bit position;
    said rate converter comprising:
    signaling memory means for storing each received said first signaling bit during one frame interval;
    means for inserting said stored first signaling bit in each said second signaling bit position of at least one subsequent one of said outgoing second frames.

11. A rate converter in accordance with claim 10, wherein predetermined ones of said outgoing first frames each include a first signaling bit position and each of said incoming second frames include a plurality of second signaling bits;
    said rate converter comprising:
    means for inserting one of said plurality of second signaling bits into said first signaling bit position of one of said outgoing first frames.

12. A rate converter in accordance with claims 9, 10 or 11, wherein each of said incoming first frames is arranged as a plurality of PCM voice channels, said rate converter comprising:
    means for generating an error detection signal for each channel of said incoming first frames; and
    means for inserting each error detection signal in a predetermined bit position of an outgoing second frame.

* * * * *